United States Patent [19]

Radich

[11] Patent Number: 5,148,446
[45] Date of Patent: Sep. 15, 1992

[54] LASER OBJECTIVE LENS SHIELD

[75] Inventor: David Radich, Lake Oswego, Oreg.

[73] Assignee: Tektronix, Inc., Wilsonville, Oreg.

[21] Appl. No.: 711,832

[22] Filed: Jun. 7, 1991

[51] Int. Cl.$^5$ .............................................. H01S 3/00
[52] U.S. Cl. .................................. 372/109; 372/101; 359/511
[58] Field of Search ................ 372/109, 101; 359/507, 359/511, 513, 808

[56] References Cited

U.S. PATENT DOCUMENTS

| 5,048,050 | 9/1991 | Komurasaki | 372/101 |
| 5,084,883 | 1/1992 | Khalid et al. | 372/101 |

*Primary Examiner*—Léon Scott, Jr.
*Attorney, Agent, or Firm*—Francis I. Gray

[57] ABSTRACT

A laser objective lens shield for preventing ejecta from a target object from impacting the objective lens has an inner and an outer conical structure that nest concentrically together. The inner conical structure has a plurality of orifices that are orthogonal to the conical axis, which is aligned with the lasing axis, and the outer conical structure has a fluid port by which a pressurized fluid hose may be coupled to the shield. Both conical structures have an exhaust aperture opposite the orifices and port, respectively. When the conical structures are nested together the edge around the exhaust apertures is sealed by suitable means, such as foam tape, so that a plenum chamber is formed between the orifices and the fluid port. Pressurized air introduced at the fluid port becomes a laminar air flow from the orifices orthogonal to the lasing axis to deflect ejecta away from the laser objective lens out the exhaust aperture.

4 Claims, 5 Drawing Sheets

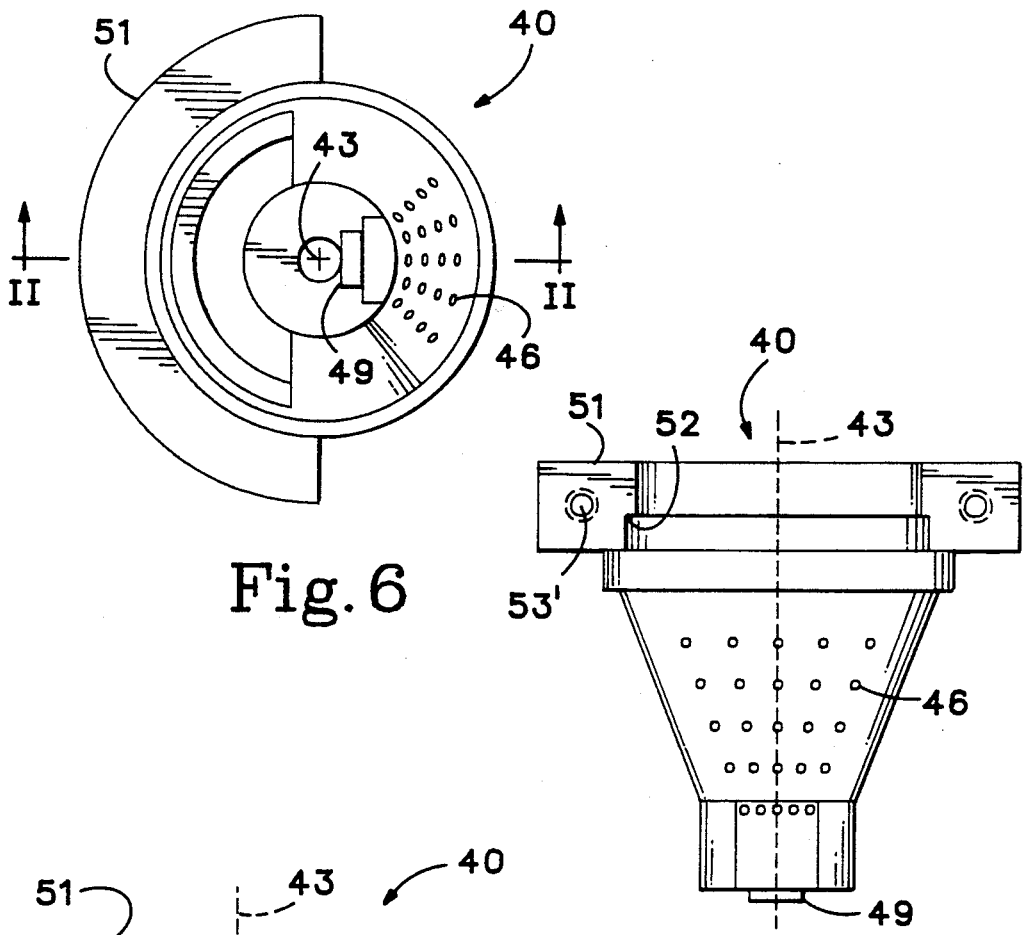
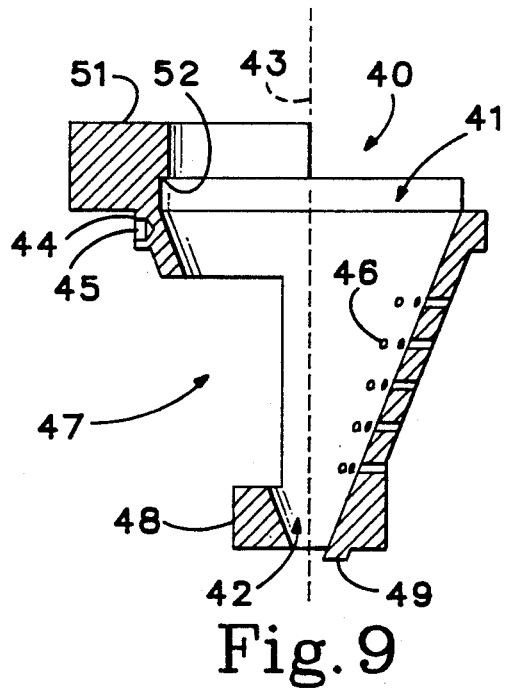
Fig. 6
Fig. 7
Fig. 8
Fig. 9

LASER OBJECTIVE LENS SHIELD

BACKGROUND OF THE INVENTION

The present invention relates to lasers, and more particularly to a laser objective lens shield for protecting the objective lens of a laser from target ejecta by deflecting the ejecta away from the lens.

In a laser scribing machine a laser is used to etch scribe lines on a target object. The energy of the laser beam on the target object causes material from the target object to be ejected. Some of this ejecta flies back to the laser to impact the laser objective lens, reducing the useful life of the lens. A prior laser objective lens shield has a conical structure open at both ends with a port by which an air supply line is coupled to the shield. Air flow is introduced via the air supply line to the interior of the conical structure for deflecting target ejecta from impacting the laser objective lens. However the air flow from a single port creates a turbulent air flow such that some of the ejecta still impacts the objective lens at even greater velocities.

What is desired is a laser objective lens shield for preventing target ejecta from impacting the laser objective lens that has an improved efficacy in deflecting the target ejecta from the lens.

SUMMARY OF THE INVENTION

Accordingly the present invention provides a laser objective lens shield having two concentric conical parts with an opening at both ends to allow laser energy to traverse the axis of the shield, the axis being aligned with the lasing axis. Approximately one-half of the periphery of the shield forms a plenum chamber that connects to the interior of the shield via orifices at right angles to the axis of the shield. The approximately other one-half of the periphery of the shield is open to provide an exhaust aperture. A source of fluid, such as air under pressure, is coupled to the plenum chamber so that the fluid flows in a laminar manner transverse to the axis of the shield from the plenum chamber through the exhaust aperture. The fluid flow deflects ejecta from a target object resulting from irradiation by the laser away from the laser objective lens.

The objects, advantages and other novel features of the present invention are apparent from the following detailed description when read in conjunction with the appended claims and attached drawing.

BRIEF DESCRIPTION OF THE DRAWING

FIG. 6 is bottom plan view of an inner conical portion of a laser objective lens shield according to the present invention.

FIG. 7 is a front plan view of the inner conical portion of FIG. 6.

FIG. 8 is a back plan view of the inner conical portion of FIG. 6.

FIG. 9 is a cross-sectional view of the inner conical portion of FIG. 6 taken along the line II—II.

DESCRIPTION OF THE PREFERRED EMBODIMENT

Figure 1:
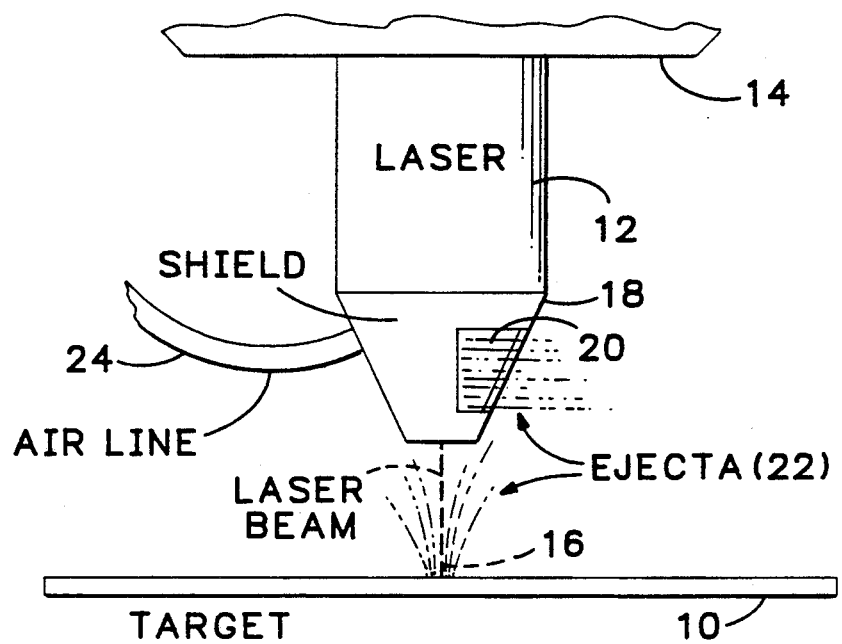
FIG. 1 is a plan view of a laser device using a laser objective lens shield according to the present invention.
Figure 2:
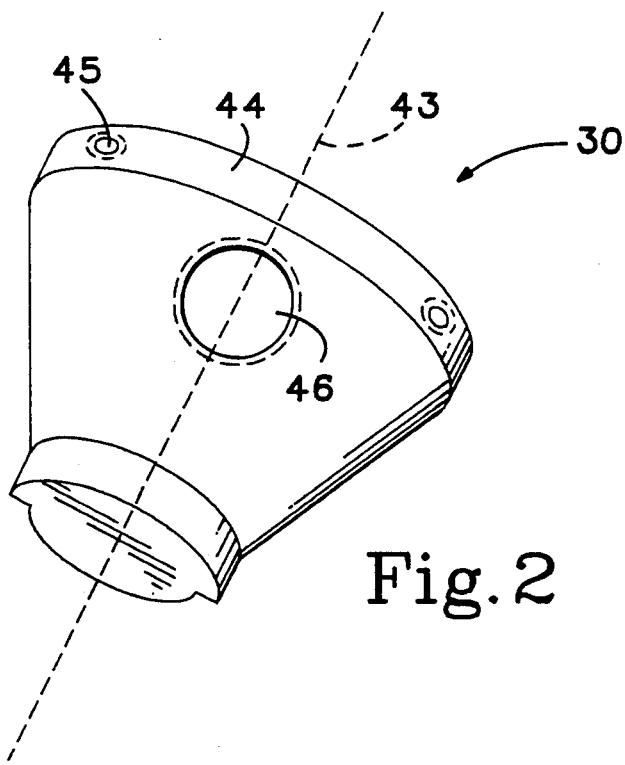
FIG. 2 is a perspective view of an outer conical portion of a laser objective lens shield according to the present invention.
Figure 3:
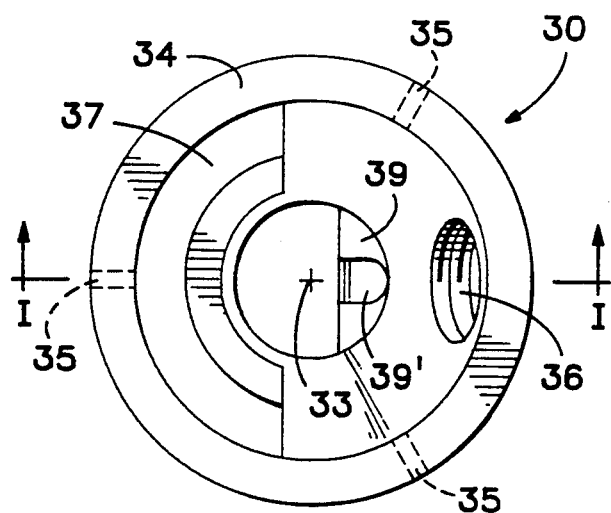
FIG. 3 is a top plan view of the outer conical portion of FIG. 1.
Figure 4:
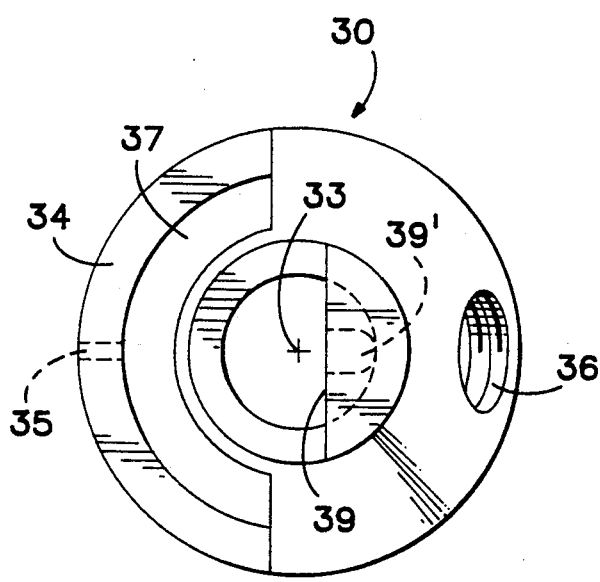
FIG. 4 is a bottom plan view of the outer conical portion of FIG. 1.
Figure 5:
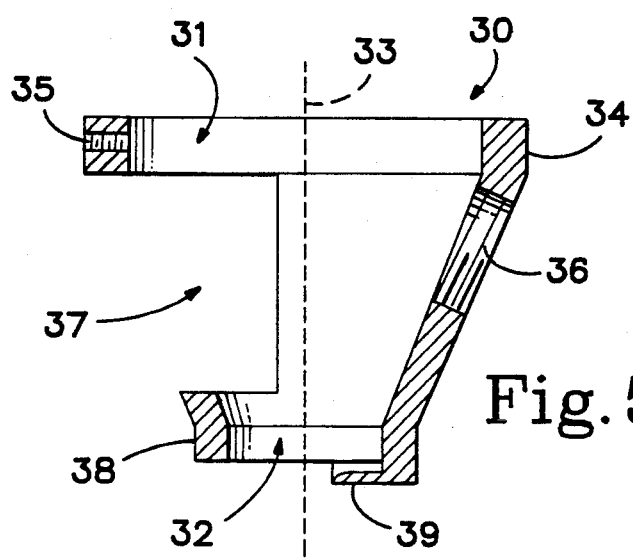
FIG. 5 is a cross-sectional view of the outer conical portion of FIG. 1 taken along the line I—I of FIG. 3.
Figure 10:
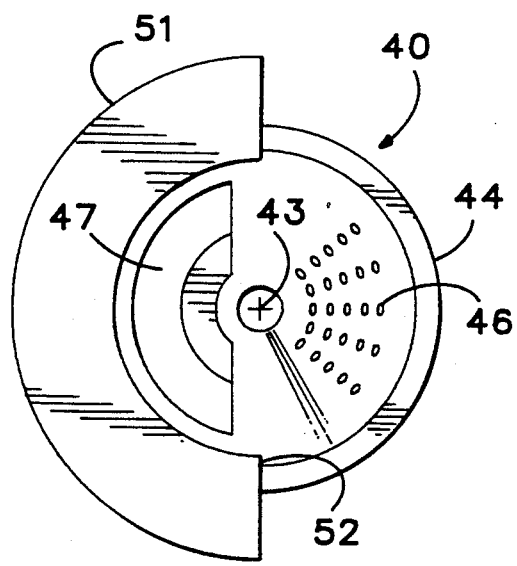
FIG. 10 is a top plan view of the inner conical portion of FIG. 6.

Referring now to FIG. 1 a typical laser application is shown for milling or scribing lines on a target 10. A suitable laser 12 is mounted on a platform 14 with the lasing axis 16 perpendicular to the surface of the target 10. A laser objective shield 18 having a conical configuration according to the present invention is mounted on the end of the laser 12 with the axis of the shield aligned with the lasing axis 16. A source of air under pressure is coupled via a suitable line 24 to the shield 18 to provide a fluid flow at right angles to the lasing axis 16. An exhaust aperture 20 in the shield 18 provides a path for the fluid flow to deflect any ejecta 22 from the target object 10 away from the laser objective lens. The laser objective lens shield 18 has three basic parts: an inner conical portion 40, an outer conical portion 30 and a retainer 50 for securing the shield to the laser 12, all as described below.

The outer conical portion 30 is shown in FIGS. 2–5 and is basically conical in shape having an opening 31, 32 at each end along the axis 33 of the cone. When mounted on the laser 10 the conical axis 33 is aligned with the lasing axis 16. A top rim 34 defining the top opening 31 has threaded set screw holes 35 by which the outer conical portion 30 is secured to the inner conical portion 40. A fluid port 36 is provided in the wall for coupling the air supply line 24 to the outer conical portion 30. Also in the wall opposite the fluid port 36 there is an outer exhaust aperture 37. A bottom rim 38 includes a protruding lip 39 that extends partially into the bottom opening 32 to provide a stop for the inner conical portion 40 when mounted within the outer conical portion 30. The protruding lip 39 includes a registration groove 39'.

As shown in FIGS. 6–10 the inner conical portion 40 also has top and bottom openings 41, 42 aligned with the cone axis 43, which when mounted to the laser 12 aligns with the lasing axis 16. A top rim 44 includes set screw insets 45 and a semi-circular mounting flange 51. The mounting flange 51 has an interior recess or lip 52. Along one side of the inner conical portion 40 are a plurality of orifices 46 that extend through the wall of the inner conical portion at right angles to the conical axis 43. In the opposite wall of the inner conical portion 40 from the orifices 46 is an exhaust aperture 47. A bottom rim 48 includes an extension 49 of the wall of the inner conical portion 40 containing the orifices 46 that is configured to mate with the groove 39' of the lip 39 of the outer conical portion 30. An orifice is formed between the protruding lip 39 and the extension 49 that is coupled to the plenum. Airflow through this orifice is at a ten degree down angle from perpendicular to the lasing axis 16.

Figure 11:
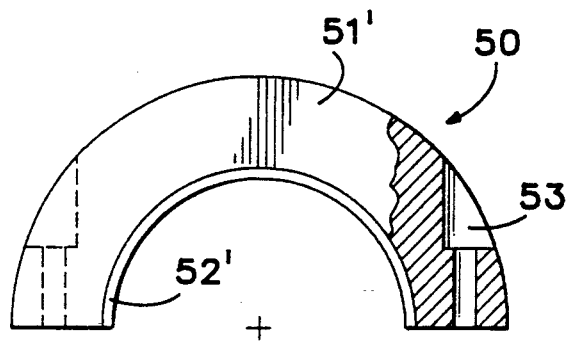
FIG. 11 is a bottom plan view in partial cross-section of a retainer for coupling a laser objective lens shield to a laser according to the present invention.

Referring now to FIG. 11 the retainer 50 is shown as semi-circular mate 51' to the flange 51 on the inner conical portion 40. The retainer 50 includes an interior recess or lip 52' that matches that on the flange 51 so that when the retainer is joined to the flange 51 by suitable means, such as screws 54 extending through screw holes 53 in the retainer into threaded apertures 53' in the flange 51, the retainer and flange secure the shield 18 to an external mounting flange on the laser 12.

Figure 12:
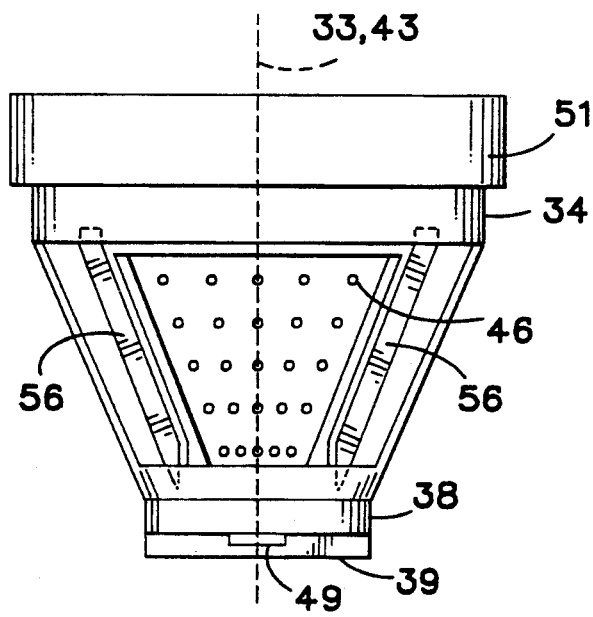
FIG. 12 is a back plan view of a laser objective lens according to the present invention.
Figure 13:
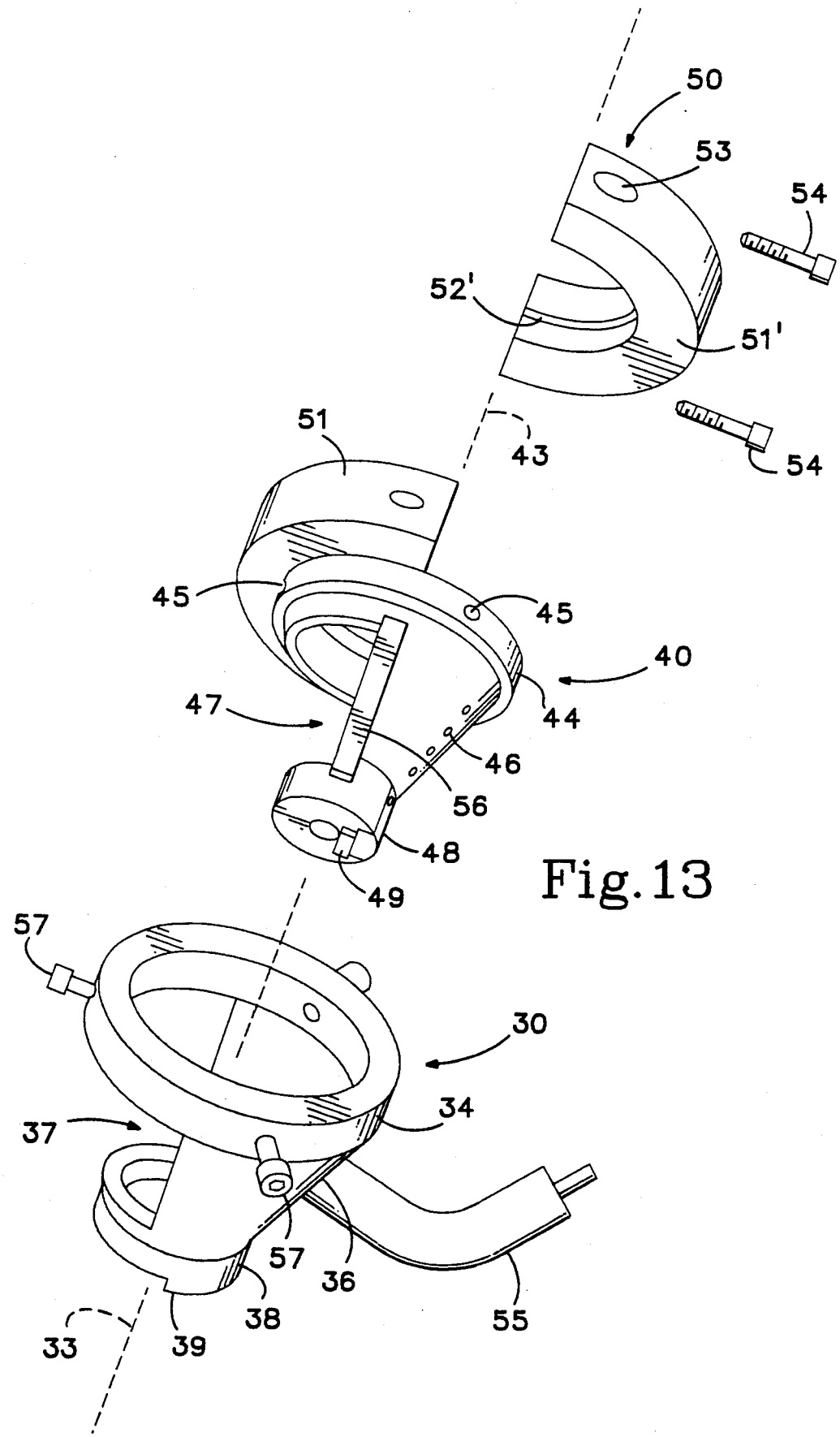
FIG. 13 is an assembly perspective view of a laser objective lens shield according to the present invention.

The shield 18 is assembled as shown in FIGS. 12 and 13 such that the inner conical portion 40 is nested concentrically within the outer conical portion 30 with the lip 49 of the inner conical portion resting in the alignment groove 39' of the lip 39 of the outer conical portion. Set screws 57 secure the inner conical portion 40 symmetrically within the outer conical portion 30, and a foam tape 56, or other type of sealant, is applied to the edges of the inner and outer conical portions at the respective exhaust apertures 37, 47 to form a plenum chamber. A fluid fitting 55 is coupled to the port 36 of the outer conical portion 30 to which the air hose 24 is coupled. The nested conical portions 30, 40 are then secured to the laser 12 by fitting the internal flange 52 of the inner conical portion 40 over the outer mounting flange of the laser and securing the retainer 50 to the flange 51 via screws 54 to firmly grip the laser about the mounting flange. Air provided to the plenum chamber via the fitting 55 traverses the interior of the shield orthogonal to the lasing axis 16 to deflect any ejecta that enters the shield through the bottom opening 32, 42 out through the exhaust aperture 20.

Thus the present invention provides a laser objective lens shield that deflects ejecta from a target object away from the laser objective lens by providing a laminar air flow orthogonal to the lasing axis.

What is claimed is:

1. An apparatus for protecting the objective lens of a laser from being impacted by ejecta from a target object comprising:
    a hollow conical structure having a base that mounts adjacent to the laser and a truncated tip, the structure having an axis aligned with the lasing axis of the laser with openings in the base and truncated tip along the axis, the hollow conical structure including a plenum chamber along a portion of the wall having orifices orthogonal to the axis and means for coupling the plenum chamber to a source of pressurized fluid, and also including an exhaust aperture in the wall opposite the orifices to provide for laminar fluid flow transverse to the lasing axis; and
    means for securing the hollow conical structure to the laser.

2. An apparatus as recited in claim 1 wherein the hollow conical structure comprises:
    an inner conical structure having the orifices along a portion of the inner wall and an inner exhaust aperture in the inner wall opposite the orifices;
    an outer conical structure concentric with the inner conical structure and having a fluid port through the outer wall and an outer exhaust aperture in the outer wall opposite the fluid port; and
    means for sealing the edges of the inner and outer exhaust apertures to form the plenum chamber between the fluid port in the outer wall and the orifices in the inner wall.

3. An apparatus as recited in claim 2 wherein the hollow conical structure further comprises means for registering the inner and outer conical structures for proper concentric alignment.

4. An apparatus as recited in claim 1 wherein the securing means comprises:
    a semi-circular flange contiguous with the base of the hollow conical structure having an interior recess to engage an exterior flange of the laser;
    a semi-circular retainer for mating with the semicircular flange having an interior recess to engage the exterior flange of the laser; and
    means for mating the semi-circular retainer to the semi-circular flange such that the interior recesses are locked together over the exterior flange of the laser to secure the apparatus to the laser.

* * * * *